P. SEYMOUR
Grain Drill.
No. 377. Reissued July 15, 1856.
Fig. 1.
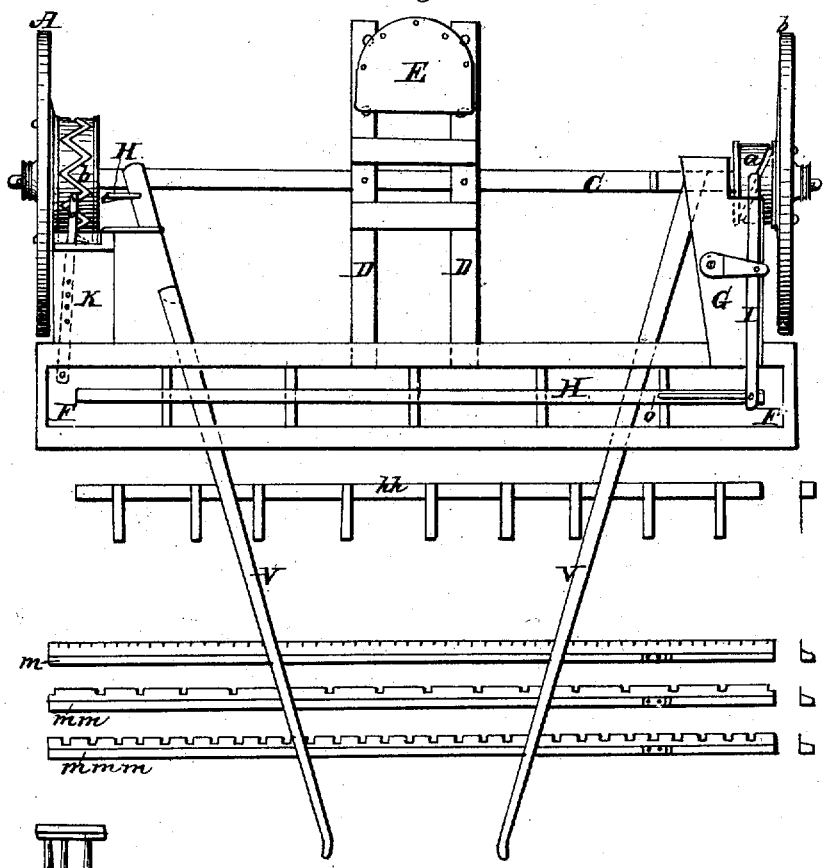
Fig. 3.
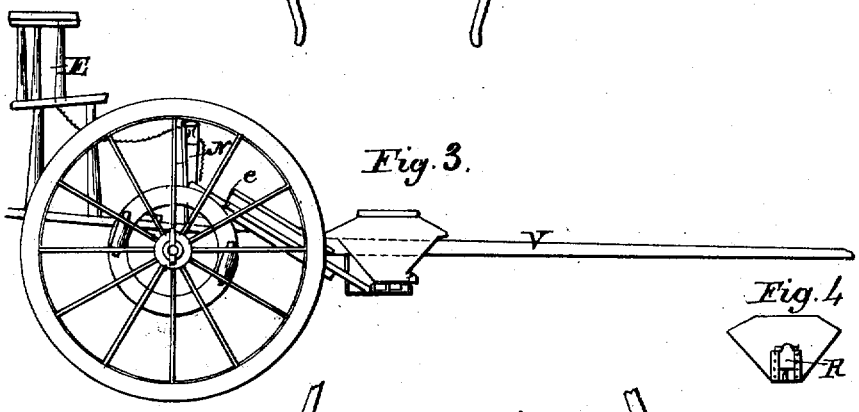
Fig. 4
Fig. 2.
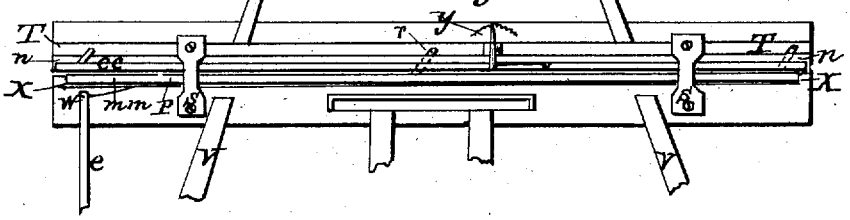
N. PETERS, PHOTO-LITHOGRAPHER, WASHINGTON D. C.

UNITED STATES PATENT OFFICE.

P. SEYMOUR, OF EAST BLOOMFIELD, NEW YORK.

IMPROVEMENT IN SOWING-MACHINES.

Specification forming part of Letters Patent No. 4,306, dated May 7, 1845; Reissue No. 377, dated July 15, 1856.

*To all whom it may concern:*

Be it known that I, PIERPONT SEYMOUR, of East Bloomfield, in the county of Ontario and State of New York, have invented a new and useful machine for sowing all kinds of grain, grass-seed, and plaster with a horse; and I do hereby declare that the following is a full, clear, and exact description of the same, reference being had to the annexed drawings, making a part of this specification, in which—

Figure 1 is a top view of said machine. Fig. 2 is a bottom view of the seed-box. Fig. 3 is a side elevation of Fig. 1, and Fig. 4 is an inside view of one end of the seed-box.

A B, Fig. 1, are the wheels that support the machine.

V V are the shafts that guide the machine when drawn by a horse; C, the axle-tree; D D, the frame-work that supports the chair E and rests on the axle-tree and seed-box, and is secured to the axle-tree by bolts or dowels.

On the wheel B is a cylinder, *a*, secured to the spokes of said wheel by keys or pins. In said cylinder is an angular groove, which works the bar I to and fro.

G is a plank secured to the axle-tree and seed-box, and supports the bar I. This bar is a lever, with a pin in one end that fits the angular groove in the cylinder *a*. Near the middle of this lever is a pin, on which the lever moves. At the other end is a strap of iron, connected to said lever by a pin, so as to form a joint. This strap of iron is secured to the rod H at O by a pin. H is a rod in the top of the seed-box F F, and is operated by the lever I.

*h h* is a side view of H. This is a rod or bar of wood having flat pieces of iron secured to it, which go down into the machine nearly to the bottom, and is called the "stirring-bar" or "plaster-breaker," and is used in sowing damp or wet plaster.

Secured to the wheel A is a cylinder, *b*, with a zigzag groove.

K is a plank-work, fastened to the shaft V, and supports the lever *e*. *e* is a lever, with a pin in one end that fits the zigzag groove in the cylinder *b*. Through the plank-work and lever are several holes, in either of which a pin may be put, which serves as a fulcrum to this lever, making it a lever with a movable fulcrum, so that a long or short motion may be given to the lower end of the said lever *e*.

X X, Fig. 2, is the lower edge of the back side of the seed-box, and is faced with iron.

*c c* is a square rod, faced with iron wider than the rod, and so placed on *n n*, which is the lower edge of the forward side of the seed-box, as to close the aperture in the bottom of the seed-box with the iron plate of the rod *c c*. This rod is then pressed close to the bottom of the box F F, and kept there by the iron guards or stirrups S S.

*r r r* are plates of iron, with a hole in each end of each plate, and one end of each plate is connected with the rod *c c* by a pin, so as to form a joint. These plates are then placed on an angle of forty-five degrees, or any angle at pleasure, but all on the same angle. The other end of each plate is then connected to T T, which is a strip of wood fixed to the under side of the box F F for that purpose. This rod *c c*, I call the "gage-rod" or a "parallel oblique slide," because the iron plate on this rod is parallel to the iron plate X X, and remains parallel thereto, while its motion in opening or closing the aperture in the bottom of the seed-box is an oblique motion. By forcing this slide endwise one way it enlarges the opening in the bottom of the machine, and by forcing it the other way it diminishes it. This may be done by a screw or lever or rap of a hammer, or otherwise. By this oblique motion of the slide the machine may be set close enough to sow grass-seed or open enough to sow peas. Y is an index or pointer, one end of which is made fast to this slide by a pin, so as to form a joint. Near the same end another pin passes through this index into the seed-box, so as to form another joint, so that the motion of the rod *c c* moves the index. With the help of this index the machine may be set to sow any given quantity per acre.

*m* and *m m* and *m m m*, Fig. 1, are three different rods, called "vibrating rods" or "dropping-rods." They are for sowing different kinds of seeds or material. One only is used at a time. *m m* in Fig. 2 is represented in Fig. 1 by a side view, being one of the three. *m* has a plate of iron, which is hacked so that it is a kind of coarse saw. This is used for sowing plaster, ashes, and lime. *m m m* has a plate of iron with notches, and is used for sowing wheat, rye, oats, barley, and peas. *m m* has a plate of thin tin, with smaller notches than the last mentioned, and at a greater distance apart. This is for sowing clover-seed and grass-seed.

R, Fig. 4, is a slide-door on the inside of the machine, that closes the small opening in the end of the seed-box through which the teeth of these rods pass into and out of the machine.

*e*, Fig. 2, is the lower end of the lever *e*, Fig. 1, and is connected with the rod *m m* by an iron hook, which hooks into the lever *e* at W and to the rod *m m* at P. By taking out this hook and raising the slide-door R the vibrating or dropping rods may be changed at pleasure. These rods rest (one at a time) on the guards or stirrups S S, and are made to vibrate by the lever *e*, which is operated by the zigzag cylinder *b*.

N, Fig. 3, is an upright post, with a pulley in the top. To the upper end of the lever *e* is attached a cord, which passes over the pulley in the post N to the chain E. By pulling this cord the pin in the upper end of the lever *e* is thrown out of the zigzag groove in the cylinder *b*, and thus the machine is made to stop sowing at pleasure.

What I claim as my invention, and desire to secure by Letters Patent, is—

1. The manner in which I have combined the stirring rod or bar H with the dropping bar or vibrating bar *m m*, and in combination therewith the gage-rod *c c*, with its index for regulating the amount of seed to be dropped, in the manner above described.

2. The lever *e*, with a movable pin or fulcrum, operated by the zigzag motion working the vibrating rods and regulating the quantity per acre to be sown by increasing or decreasing the motion of the vibrating rod, as set forth.

PIERPONT SEYMOUR.

Witnesses:

ROSWELL C. MUNSON,
WILLIAM PARMELEE.